(12) United States Patent
Teshigawara et al.

(10) Patent No.: US 11,231,341 B2
(45) Date of Patent: Jan. 25, 2022

(54) METHOD AND SYSTEM FOR DECIDING DAMAGE DEGREE CATEGORY

(71) Applicants: THE UNIVERSITY OF TOKYO, Tokyo (JP); ALAB INC., Tokyo (JP)

(72) Inventors: Masaomi Teshigawara, Nagoya (JP); Koichi Kusunoki, Tokyo (JP); Masayuki Araki, Tokyo (JP)

(73) Assignees: THE UNIVERSITY OF TOKYO, Tokyo (JP); ALAB INC., Tokyo (JP)

( * ) Notice: Subject to any disclaimer, the term of this patent is extended or adjusted under 35 U.S.C. 154(b) by 41 days.

(21) Appl. No.: 16/629,004

(22) PCT Filed: Jul. 6, 2018

(86) PCT No.: PCT/JP2018/025665
§ 371 (c)(1),
(2) Date: Jan. 6, 2020

(87) PCT Pub. No.: WO2019/009406
PCT Pub. Date: Jan. 10, 2019

(65) Prior Publication Data
US 2020/0124495 A1 Apr. 23, 2020

(30) Foreign Application Priority Data

Jul. 7, 2017 (JP) .............................. JP2017-134097

(51) Int. Cl.
*G01M 5/00* (2006.01)
(52) U.S. Cl.
CPC ........ *G01M 5/0033* (2013.01); *G01M 5/0041* (2013.01); *G01M 5/0066* (2013.01)
(58) Field of Classification Search
None
See application file for complete search history.

(56) References Cited

U.S. PATENT DOCUMENTS

| 2014/0324356 A1 | 10/2014 | Park et al. | |
| 2015/0355050 A1* | 12/2015 | Yoshida | G01M 5/0066 702/56 |
| 2016/0084961 A1* | 3/2016 | Morishita | G01M 5/0066 342/357.52 |

FOREIGN PATENT DOCUMENTS

| EP | 2947445 A1 | 11/2015 |
| JP | 2003344213 A | 12/2003 |

(Continued)

OTHER PUBLICATIONS

Espacenet.com machine translation of JP2003344213A, Hara et al., "Device and Method for Evaluating Aseismatic Performance of Building," Dec. 3, 2003 (Year: 2003).*

(Continued)

*Primary Examiner* — Eman A Alkafawi
*Assistant Examiner* — Denise R Karavias
(74) *Attorney, Agent, or Firm* — McCoy Russell LLP

(57) ABSTRACT

A method for evaluating damage degree and a system for implementing the same. A polygonal line including a first break point, a second break point, and a maximum response point is determined from a performance curve of each layer of a building. A maximum interlayer deformation angle of each layer is calculated from a maximum interlayer displacement of each layer and its corresponding interlayer height. A safety margin of each layer is calculated from the maximum interlayer deformation angle and a safety limit deformation angle, safety margins are compared, and one polygonal line having the smallest safety margin is selected. A safety limit point is calculated using the polygonal line selected. Damage degree categories are defined using the first break point, the second break point, and the safety limit (Continued)

point. One damage degree category, to which the maximum response point corresponds, is decided out of the damage degree categories.

10 Claims, 9 Drawing Sheets

(56) References Cited

FOREIGN PATENT DOCUMENTS

| JP | 2011095237 A | 5/2011 |
|---|---|---|
| WO | 2014112630 A1 | 7/2014 |

OTHER PUBLICATIONS

Kusunoki, K. et al., "A New Acceleration Integration Method to Develop a Real-Time Residual Seismic Capacity Evaluation System," Journal of Structural and Construction Engineering (Transactions of AIJ), vol. 68, No. 569, Jul. 2003, 8 pages. (Submitted with English Abstract).

Kawamura, M. et al., "Study of a New Method to Compute the Performance Curve of Real Structures With Acceleration Sensors," Journal of Structural and Construction Engineering (Transactions of AIJ), vol. 78, No. 688, Jun. 2013, 9 pages. (Submitted with English Abstract).

ISA Japan Patent Office, International Search Report Issued in Application No. PCT/JP2018/025665, dated Sep. 4, 2018, WIPO, 4 pages.

\* cited by examiner

METHOD AND SYSTEM FOR DECIDING DAMAGE DEGREE CATEGORY

CROSS-REFERENCE TO RELATED APPLICATIONS

The present application is a U.S. National Phase of International Patent Application Serial No. PCT/JP2018/025665 entitled "METHOD FOR DETERMINING DISASTER LEVEL CLASSIFICATION AND SYSTEM FOR DETERMINING DISASTER LEVEL CLASSIFICATION," filed on Jul. 6, 2018. International Patent Application Serial No. PCT/JP2018/025665 claims priority to Japanese Patent Application No. 2017-134097 filed on Jul. 7, 2017. The entire contents of each of the above-referenced applications are hereby incorporated by reference for all purposes.

TECHNICAL FIELD

The present invention relates to a method for evaluating damage degree of buildings and a system for implementing the same.

BACKGROUND ART

Known examples of a method for promptly and objectively measuring residual aseismic performance of a building after a big earthquake include the following (Patent documents 1 and 2). For example, the patent document 1 describes that measuring instruments, such as an accelerograph, are installed on all layers (floors) of a building, the representative displacement is calculated, the performance curve is drawn (plotted), the demand curve is drawn (plotted) using the building design drawings or the like, the both curves are compared, and it enables the building to be evaluated whether being safe or dangerous.

The Japan Building Disaster Prevention Association specifies six damage degree categories according to the damage degree of the building, the damage degree of which is classified in one of: (I) no damage; (II) minor damage; (II) slight damage; (IV) half damage; (V) heavy damage; or (VI) collapse. Additionally, the Association is committed to activities involved, for example, training emergency risk assessment engineers who actually evaluate the damage degree or introducing a certification system of registering the emergency risk assessment engineers.

CITATION LIST

Patent Literature

Patent Document 1: Japanese Unexamined Patent Application Publication No. 2011-095237
Patent Document 2: Japanese Unexamined Patent Application Publication No. 2003-344213

SUMMARY OF INVENTION

Technical Problems

The methods described in the above patent documents can assess a residual aseismic performance of a building but cannot automatically perform "damage degree category decision" specified by the Association without human intervention. Consequently, trained emergency risk assessment engineers must visit the disaster area and must evaluate the damage degree of each building with Human Wave Tactics.

To solve the above problem, it is a technical object of the present invention to provide a method for deciding a damage degree category without human intervention and a system for implementing the same.

Solution to Problem

A first aspect of a method for deciding a damage degree category according to the present invention provides a method for deciding a damage degree category of a building having one or more layers. The method includes Step S1 of determining a polygonal line from a performance curve of each layer of the building, the polygonal line including a first break point P1, a second break point P2, and a maximum response point Pm, Step S2 of calculating a maximum interlayer deformation angle of each layer from a maximum interlayer displacement of each layer and its corresponding interlayer height, Step S3 of calculating a safety limit deformation angle of each layer, Step S4 of calculating a safety margin of each layer from the maximum interlayer deformation angle and the safety limit deformation angle of each layer, comparing safety margins, and selecting one polygonal line having the smallest safety margin, Step S5 of calculating a safety limit point Ps using the polygonal line selected in Step S4, Step S6 of defining damage degree categories (I) to (VI) using the first break point P1 and the second break point P2 determined in the Step S1 and the safety limit point Ps, and Step S7 of deciding one damage degree category, to which the maximum response point Pm corresponds, out of the damage degree categories.

Such a method for deciding the damage degree category includes determining a simple polygonal line (e.g. polygonal line having two break points) from a complicated performance curve of each layer showing time-series measured data of a relative displacement and an absolute acceleration. Subsequently, the safety margins respectively calculated from the safety limit deformation angles and the maximum interlayer deformation angles of the layers are compared, one polygonal line is selected using the comparison result, and the safety limit point is calculated using the selected polygonal line. It enables the damage degree categories to be defined and one corresponding damage degree category to be automatically decided.

In the first aspect of the method for deciding the damage degree category according to the present invention, a response history line is determined by sequentially searching for either one of a maximal value (local maximum value) and a minimal value (local minimum value) of the relative displacement in the performance curve. Then, one area (integral value) delimited by the response history line from an origin to the first break point P1 and an x-axis and the other area of a triangle with apexes including the origin, the first break point P1, and a corresponding point on the x-axis are calculated. It is characterized that a discrepancy between the two areas is within a predetermined range.

In the first aspect of the method for deciding the damage degree category according to the present invention, one area (integral value) delimited by the response history line from the first break point P1 to the second break point P2 and the x-axis and the other area of a trapezoid with apexes including the first break point P1, the second break point P2, and corresponding two points on the x-axis are calculated. It is characterized that a discrepancy between the two areas is within a predetermined range.

Such a configuration enables the first break point P1 and the second break point P2 to be easily determined from the performance curve and also the performance curve to be automatically contracted into a polygonal line.

In the first aspect of the method for deciding the damage degree category according to the present invention, the performance curve is constructed by the time-series measured data of the relative displacement and the absolute acceleration.

Such a configuration enables the performance curve to be easily determined from the measured data of the relative displacement and the absolute acceleration.

In the first aspect of the method for deciding the damage degree category according to the present invention, the performance curve is determined from a single or a plurality of waveforms decomposed into respective frequencies by frequency analysis.

Such a configuration enables disturbances including noise to be excluded and allows a corresponding damage degree category to be decided with higher precision.

According to a second aspect of the present invention, a system for deciding a damage degree category includes at least one sensor selected from an accelerometer, a velocimeter, and a displacement meter, the sensor being installed on all layers or a plurality of predetermined layers of a building, a recording device for storing measured data of each layer, and a microprocessor for processing the measured data.

The microprocessor performs

Step S1 of determining a performance curve of each layer of the building from the measured data of each layer stored in the recording device and determining from each performance curve a polygonal line including a first break point P1, a second break point P2, and a maximum response point Pm, Step S2 of calculating a maximum interlayer deformation angle of each layer from a maximum interlayer displacement of each layer and its corresponding interlayer height, Step S3 of calculating a safety limit deformation angle of each layer, Step S4 of calculating a safety margin of each layer from the maximum interlayer deformation angle and the safety limit deformation angle of each layer, comparing safety margins, and selecting one polygonal line having the smallest safety margin, Step S5 of calculating a safety limit point Ps from the polygonal line selected in Step S4, Step S6 of defining damage degree categories (I) to (VI) using the first break point P1 and the second break point P2 determined in the Step S1 and the safety limit point Ps, and Step S7 of deciding one damage degree category, to which the maximum response point Pm corresponds, out of the damage degree categories.

Such a system for deciding the damage degree category enables the corresponding damage degree category to be automatically decided without human intervention using the complicated performance curve showing time-series measured data of a relative displacement and an absolute acceleration.

In the second aspect of the system for deciding the damage degree category according to the present invention, a response history line is determined by sequentially searching for either one of a maximal value (local maximum value) and a minimal value (local minimum value) of the relative displacement in the performance curve. Then, one area (integral value) delimited by the response history line from an origin to the first break point P1 and an x-axis and the other area of a triangle with apexes including the origin, the first break point P1, and a corresponding point on the x-axis are calculated. It is characterized that a discrepancy between the two areas is within a predetermined range.

In the second aspect of the system for deciding the damage degree category according to the present invention, one area (integral value) delimited by the response history line from the first break point P1 to the second break point P2 and the x-axis and the other area of a trapezoid with apexes including the first break point P1, the second break point P2, and corresponding two points on the x-axis are calculated. It is characterized that a discrepancy between the two areas is within a predetermined range.

Such a configuration can provide a system enabling the first break point P1 and the second break point P2 to be easily determined from the performance curve and also the performance curve to be automatically contracted into a polygonal line.

In the second aspect of the system for deciding the damage degree category according to the present invention, the performance curve is constructed by the time-series measured data of the relative displacement and the absolute acceleration.

Such a configuration can provide the system for deciding the damage degree category, and the system enables the performance curve to be easily determined from the measured data of the relative displacement and the absolute acceleration.

In the second aspect of the system for deciding the damage degree category according to the present invention, the performance curve is determined from a single or a plurality of waveforms decomposed into respective frequencies by frequency analysis.

Such a configuration can provide the system for deciding the damage degree category, and the system enables disturbances including noise to be excluded and allows the corresponding damage degree category to be decided with higher precision.

Advantageous Effect

According to any aspect of the present invention, the corresponding damage degree category of each building can be decided in accordance with the categories specified by the Japan Building Disaster Prevention Association without human intervention.

DESCRIPTION OF EMBODIMENTS

Embodiments of the present invention will be described below with reference to drawings. The same or similar members are identified with the same reference signs or presented changing only their reference signs, and their description may be omitted. However, each embodiment should be interpreted in a purposive way to understand technical ideas of the present invention and should not be interpreted so as to limit the gist of the invention.

First Embodiment

Figure 9:
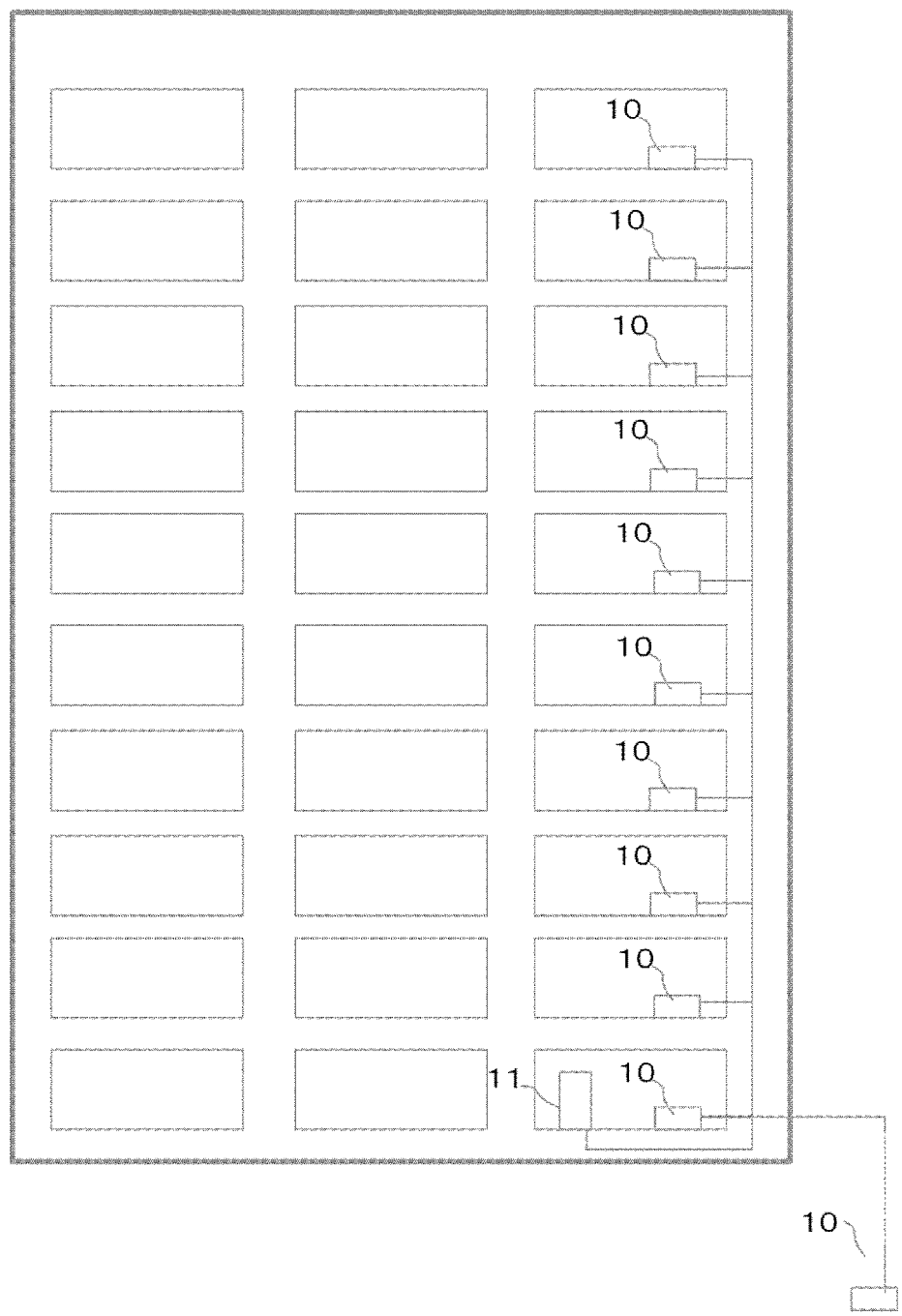
FIG. 9 is a diagram of a building with each layer where an accelerometer is installed.

FIG. 9 shows a building with each layer (floor) where an accelerometer 10 is installed. Since buildings can be formed variously, the building shape is not limited to a rectangular building shown in FIG. 9.

The accelerometer 10 installed on each layer measures acceleration, the acceleration data is recorded in an administrative server 11, and necessary data is transmitted to a cloud service through the Internet at optional timing. The accelerometer located the lowest is installed on the foundation or the ground floor. The sensor installed on each layer may be a velocimeter or a displacement meter and not limited to the accelerometer. Alternatively, both the accelerometer and the displacement meter may be installed on each layer.

The sensor is preferably installed on every layer (floor) but may be installed on a plurality of predetermined layers but not all layers of a building.

The sensors may be installed only on the plurality of predetermined layers not all the layers of the building due to some reasons, such as the budget constraint and the installation site constraint. For such an installment, data of each layer where the sensor is not installed can be calculated by linear interpolation from data of the corresponding upper and lower layers or can be calculated by a simulation using a model or the like expressing dynamic characteristics of the building. For example, the sensors may be installed only on odd-numbered layers, or the plurality of predetermined layers where the sensors are installed can be determined depending on each building, that is, in consideration for the budget or installation site constraint or the like as described above.

In the embodiments according to the present invention, the performance curve is curved lines showing time response in acceleration to the displacement. The performance curve includes the relative displacement between respective layers (interlayer displacement) on a horizontal axis (x-axis) and the absolute acceleration on a vertical axis (y-axis) plotted every predetermined hours and is constructed by the time-series data of the relative displacement and the absolute acceleration.

The above typically corresponds to a graph known as "relation between layer shear force and interlayer displacement", but the absolute accelerations are plotted on the y-axis in the embodiments according to the present invention.

The relative displacement is calculated from a difference between absolute displacements of the vertically adjacent layers.

The relative displacement can be calculated by the second-order integration of an acceleration measured by the accelerometer with time. Alternatively, the acceleration can be calculated by the second-order differentiation of a displacement measured by the displacement meter, the acceleration can also be calculated by the first-order differentiation of a velocity measured by the velocimeter, and the displacement can sill also be calculated by the first-order integration of the velocity.

Such a differential and an integration may be processed using a microprocessor in the administrative server 11 or other microprocessors of the cloud service. Alternatively, such a microprocessor, for example, a microcomputer may be built into the sensor.

The performance curve of each layer can be easily drawn by measuring the absolute acceleration and the relative displacement of each layer and then plotting the relative displacement γ on the horizontal axis (x-coordinate) and the absolute acceleration on the vertical axis (y-coordinate) time-sequentially. Alternatively, instead of the accelerometer, a velocimeter or a displacement meter may be used for the measurement. The acceleration, velocity, and displacement can be calculated by differentiating or integrating them each other with time, that is, they can be converted among each other.

The performance curve may be directly measured with two sensors (the accelerometer or the displacement meter). This measurement has an advantage allowing the integration to be unnecessary, because the absolute acceleration and the relative displacement can be directly obtained.

Figure 1:
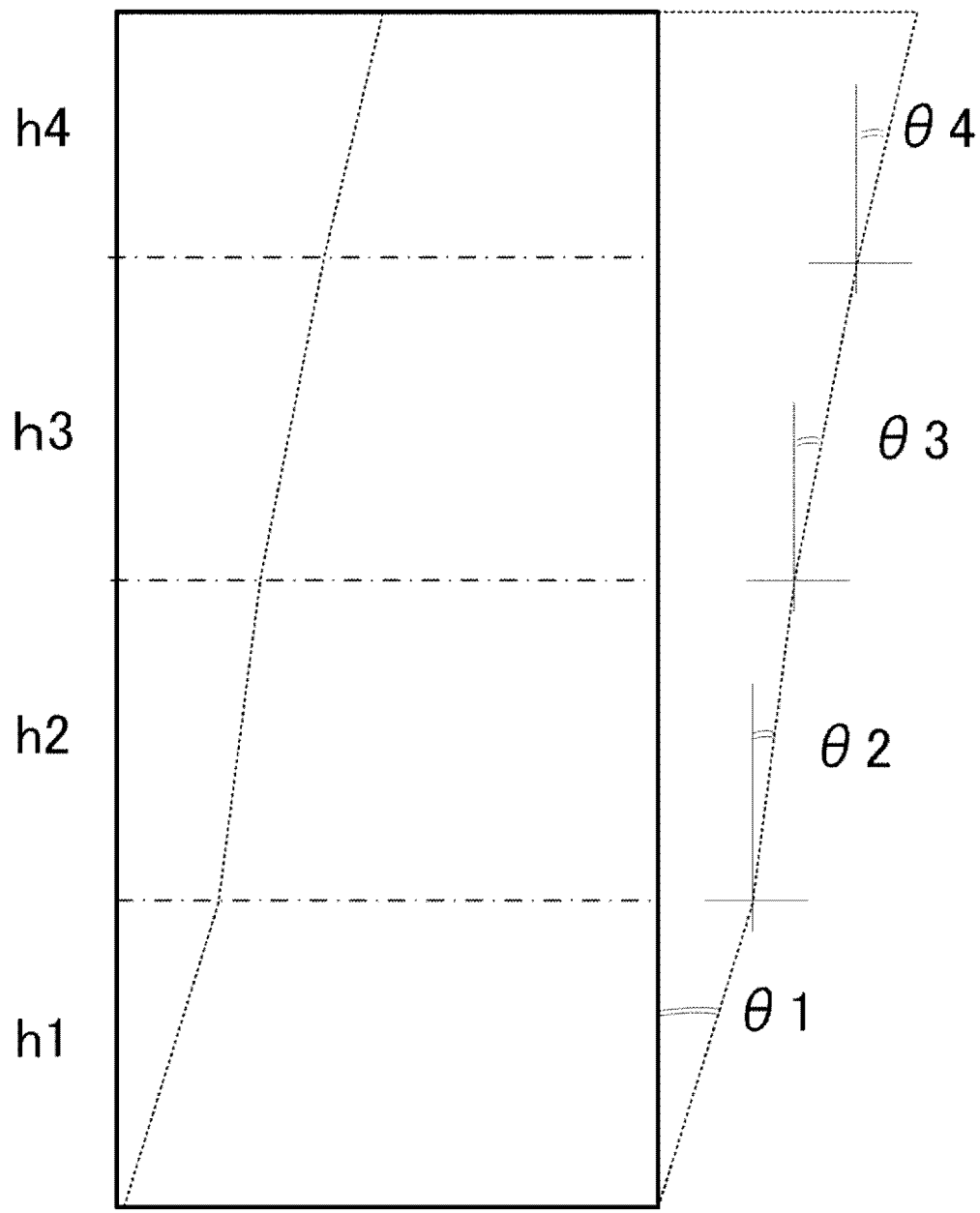
FIG. 1 is a view of a building with each layer deformed by an earthquake.

FIG. 1 is a view of a building with each layer deformed by an earthquake, and a formula 1 is derived: $\delta_i = h_i \cdot \tan \theta_i$ (formula 1), wherein $\delta_i$ represents a displacement amount of each layer, which is the relative displacement between the targeted layer and the lower layer; $\theta_i$ represents an interlayer deformation angle of $i^{th}$ layer; and $h_i$ represents a vertical difference (interlayer height) between the $i^{th}$ layer and $i+1^{th}$ layer.

Design drawings of the building describe an upper limit of the interlayer deformation angle of each layer that can held, that is, a threshold being a safety limit of the interlayer deformation angle ("safety limit deformation angle $\beta_{i_{max}}$"). In case that the interlayer deformation angle $\theta_i$ in the formula 1 exceeds the safety limit deformation angle, the building would collapse theoretically and thus is evaluated as "extremely danger".

Figure 2:
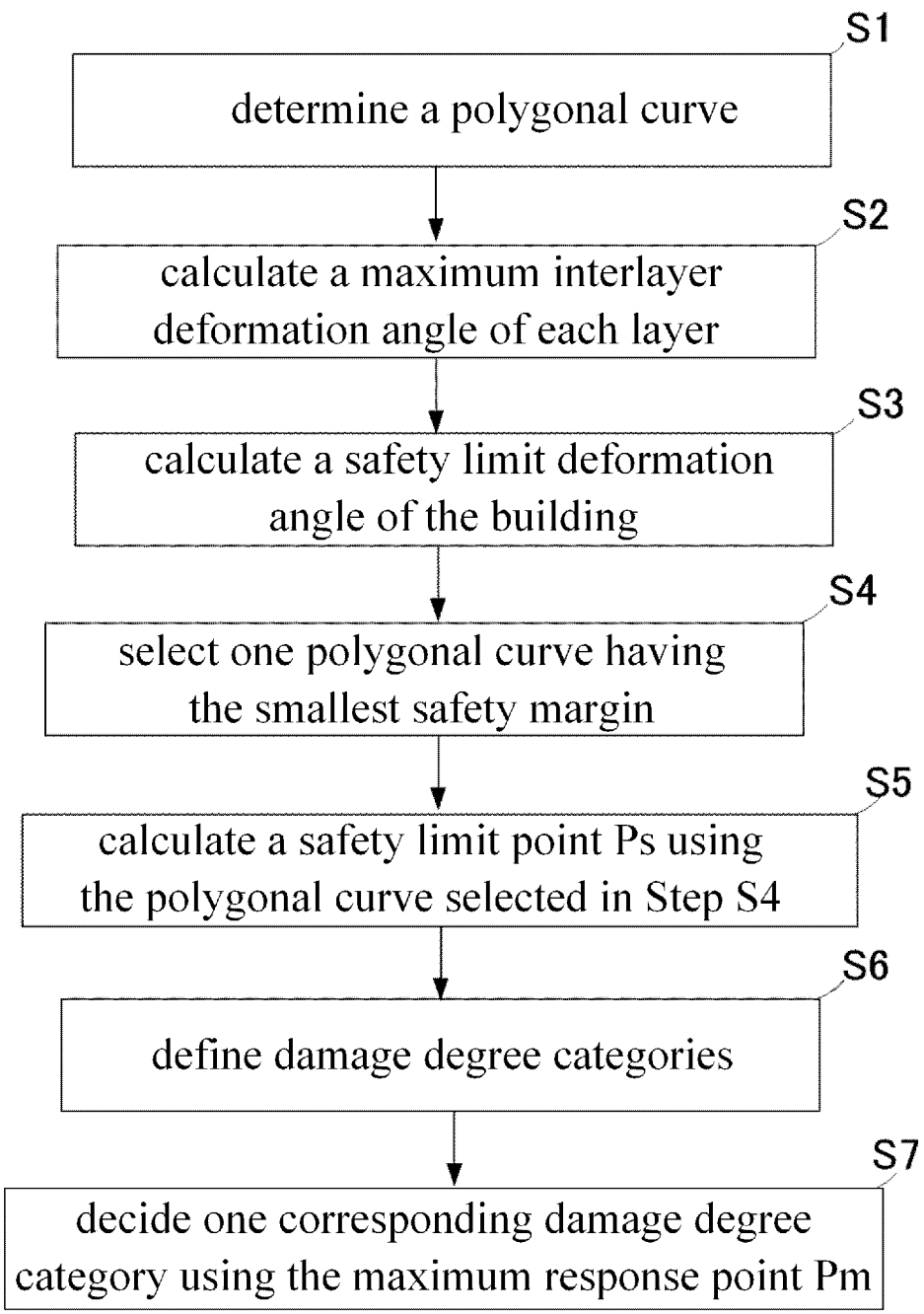
FIG. 2 is a flowchart showing basic steps of a method for deciding a damage degree category according to embodiments of the present invention.

A method for deciding a damage degree category will be described with reference to FIG. 2. FIG. 2 is a flowchart showing basic steps of the method for evaluating damage degree.

In a first step (S1), a polygonal line including a first break point P1, a second break point P2, and a maximum response point Pm is determined from the performance curve for each layer. This step will be described with reference to FIGS. 3 to 7.

Figure 3A:
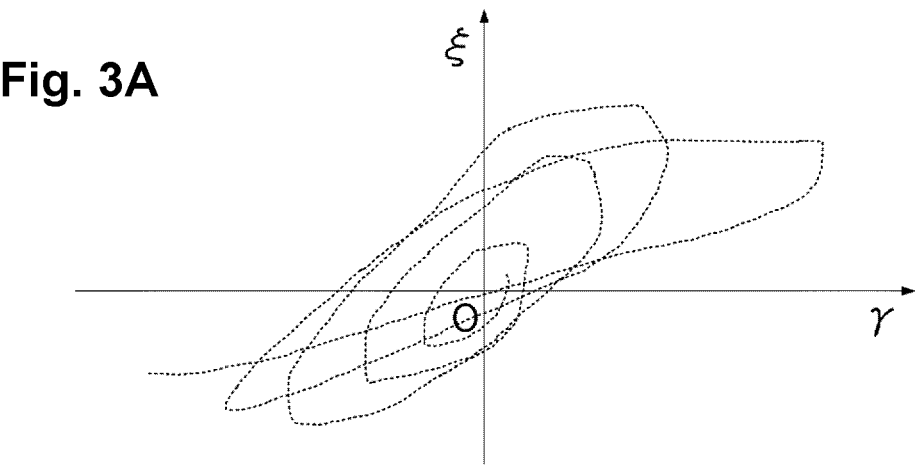
FIG. 3A and FIG. 3B illustrate an algorithm of determining a response history line from the performance curve.
Figure 3B:
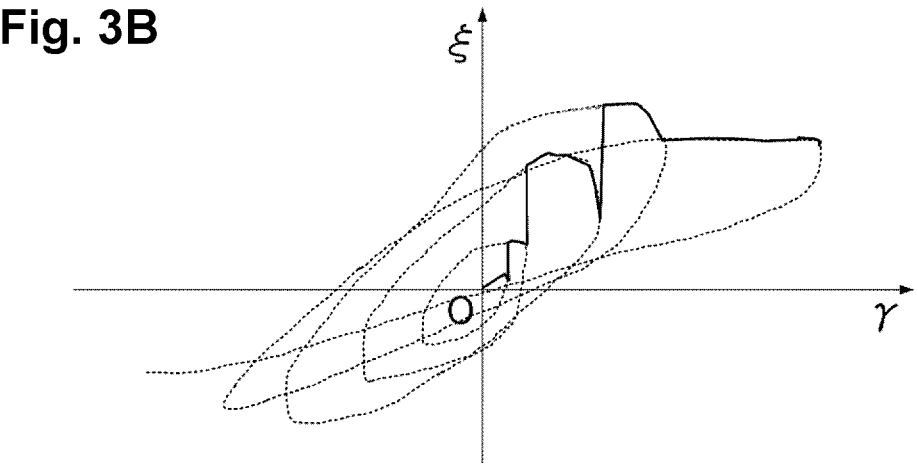

FIG. 3A shows a performance curve (dashed line) of a certain layer. FIG. 3B shows the performance curve in FIG. 3A, wherein solid lines time-sequentially connecting maximal response points are drawn.

Additionally, a frequency analysis of the measured data may be performed to effectively eliminate the influence by disturbances other than earthquake motions. Since the performance curve comes up as a response to an actual earthquake, error in the performance curve can be greater for the building influenced by a higher mode.

To reduce the error, a highly precise assessment of a residual aseismic performance uses known methods (e.g. patent document 1) to decompose the measurement value into waveforms corresponding to respective frequencies (frequency response waveform) by a frequency analysis (e.g. a wavelet transformation) of measurement values of an acceleration sensor. Subsequently, the obtained frequency response waveform is decomposed into a plurality of ranks, and the relative displacement and the absolute acceleration in each rank is preferably calculated by differentiating or integrating amplitude of the frequency response waveform decomposed into each rank with time. In this case, a rank selection algorithms is used to automatically select one rank with the largest amplitude among each rank and to adopt a performance curve in the selected rank.

Figure 8:
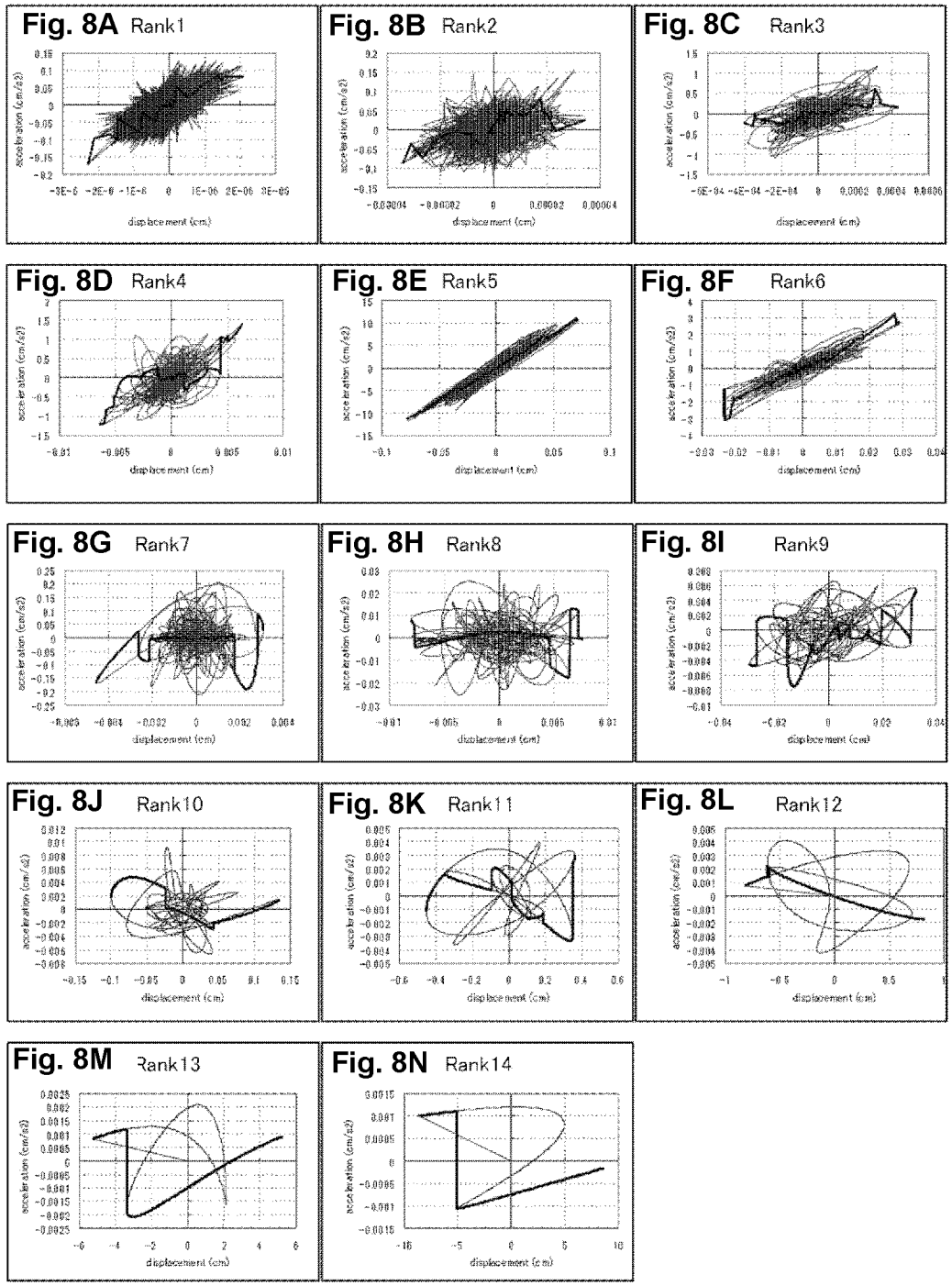
FIG. 8A to FIG. 8N are examples of performance curves that are wavelet transformed and ranked using the wavelet transformation result.

For instance, FIGS. 8A to 8N are examples of a performance curve, which is ranked in 14 ranks by the wavelet transformation. The solid lines drawn in each of FIGS. 8A to 8N time-sequentially connect maximal response points. Out of these examples, it is preferable to select the performance curve in "Rank 5" and assess the residual aseismic performance of the selected performance curve.

The patent document 1 describes that waveforms, which are decomposed into respective frequencies by frequency analysis, are ranked, and then a relative displacement and an absolute acceleration are calculated from a plurality of frequency response waveforms in each rank. Alternatively, as in a typical frequency analysis, the relative displacement and the absolute acceleration are calculated from a single waveform, which is decomposed in respective frequency band modes, and then the performance curve can be determined.

However, the performance curve can be also constructed by the relative displacement and the absolute acceleration obtained by measurement without performing such a frequency analysis.

Furthermore, locking vibration (vertical rotation) of buildings may occur during earthquakes, leading to, for example, a disturbance in relative displacement. The total bending component can be estimated by assuming the locking vibration that may occur, and then the bending component (the amount influenced by the locking vibration) may be subtracted from the relative displacement and the absolute acceleration. (see e.g. the patent document 1).

Examples of an algorithm of determining a contraction model of the polygonal line including a first break point P1, a second break point P2, and a maximum response point Pm will be described below.

First, an approach of contracting complicated performance curves of respective layers into polygonal lines using area approximations will be described.

In the present specification, "polygonal line contraction model" means an algorithm for contracting "a response history line" into a simple "polygonal line", that is, a polygonal line graph including bending points (P1 and P2) by using the area approximations. The "response history line" is determined from the performance curve by time-sequentially connecting maximal response points.

Figure 7:
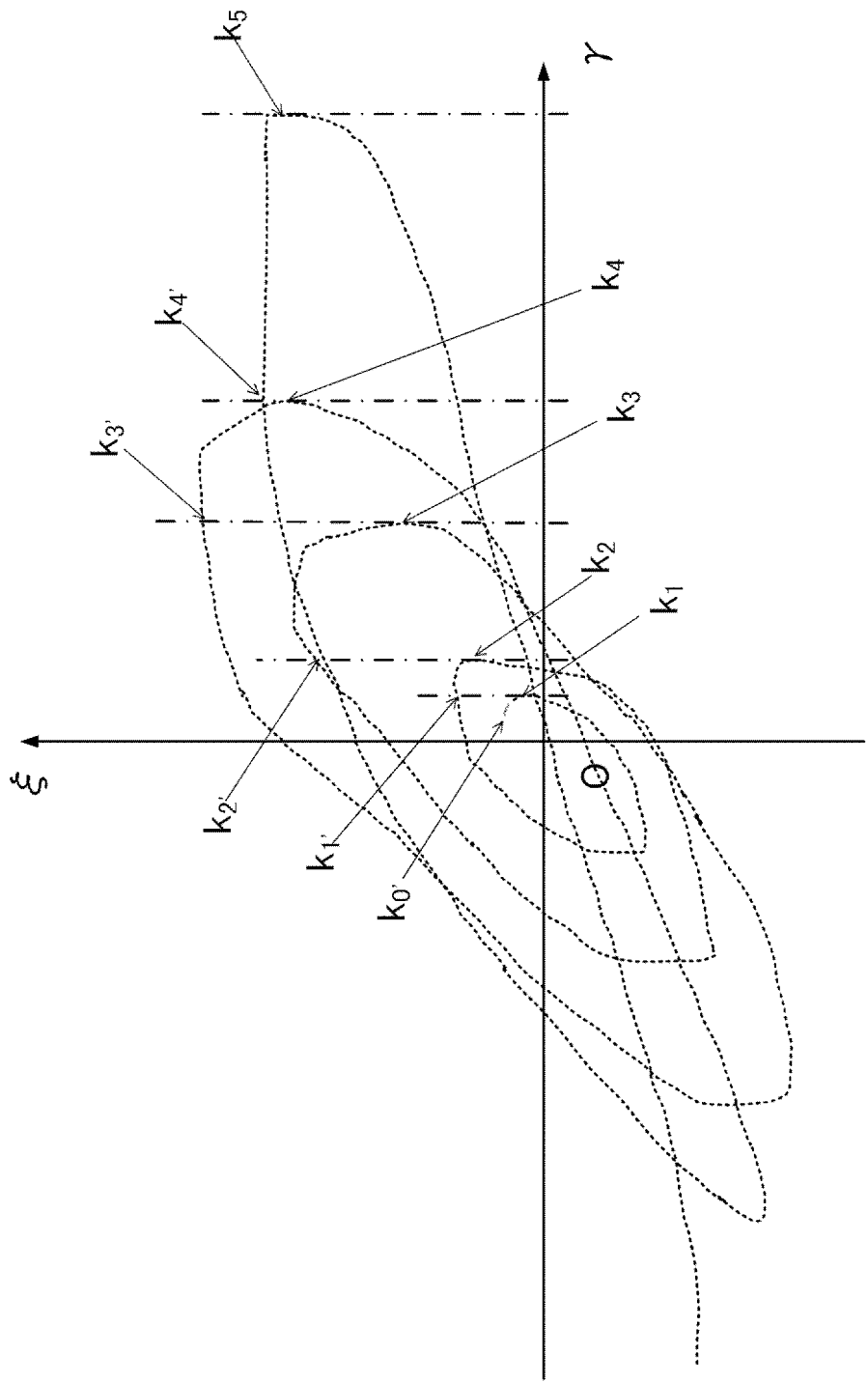
FIG. 7 is an enlarged view illustrating the algorithm of determining the response history line from the performance curve.

A method for preparing the response history line will be described in detail with reference to FIG. 7 that is an enlarged view of FIG. 3A.

The relative displacement ($\gamma$) and the absolute acceleration ( ) of each layer obtained by measurements are time-sequentially arranged from the start of the measurements (origin). For example, the relative displacement and the absolute acceleration of the $i^{th}$ layer can be respectively represented as "$\gamma_i$" and "$\xi$" but may be represented as "$\gamma$" and "$\xi$" for brevity below.

The measured data of the relative displacement ($\gamma$) and the absolute acceleration ($\xi$) are stored in a recording device as discrete data, and the relative displacement and the absolute acceleration are respectively represented as $\gamma(k)$ and $\xi(k)$ using k as an index of measurement order (measurement time). The index k is an integer equal to or greater than 0 and is incremented by 1 with time, and k allows the relative displacement $\gamma(k)$ and the absolute acceleration $\xi(k)$ to be time-sequentially arranged.

The origin (k=0 presented as $k=0=k_{0'}$ for convenience sake) represents a measurement starting point or an assessment starting point of a residual aseismic performance.

First, the relative displacements are sequentially searched in order from the origin (k=0 presented as $k=0=k_{0'}$ for convenience sake) to find a first maximal value ($\gamma(k_1)$) of the relative displacements with time, wherein k is incremented by 1. The absolute acceleration corresponding to $\gamma(k_1)$ is $\xi(k_1)$.

Subsequently, the relative displacements are sequentially searched in order from $k_1$ to find $k_{1'}$ where $\gamma(k_1)=\gamma(k_{1'})$ holds true, wherein k is incremented by 1.

However, $\gamma(k)$ is a discrete value, and thus, $k_{1'}$ where $\gamma(k_1)=\gamma(k_{1'})$ holds true may not found in some examples. In this case, a value E greater than 0 is set, and the sequential search of the relative displacements is continued until a value $k_{1'}$ where a formula 2 holds first true is found: abs($\gamma(k_1)-\gamma(k_{1'}))\le\epsilon$ (formula 2), a. wherein "abs ( )" represents an absolute value. The value $\epsilon$ can be appropriately determined from the obtained value $\gamma(k_1)$.

Examples of the value $\epsilon$ includes a value twice to three times as great as a detection resolution of the relative displacement and a difference between the value $\gamma(k)$ and a value time-sequentially next to the value $\gamma(k)$. Accordingly, a value once to three times as great as a minimum value of the absolute value of $\gamma(k)-\gamma(k+1)$ can be set to the value c in one example, wherein a value k is predetermined. However the value $\epsilon$ is not limited to the above value and can be set appropriately.

Hereafter, "a value j where $\gamma(k)=\gamma(j)$ holds true is found" is represented as the above formula 2 for brevity. Accordingly, the above means that a value j is found in the range of the value E, wherein $\gamma(k)$ and $\gamma(j)$ are matched.

Second, the relative displacements are searched in order from $k_{1'}$ to find a second maximal value ($\gamma(k_2)$) of the relative displacements to time, wherein k is incremented by 1. The absolute acceleration corresponding to $\gamma(k_2)$ is $\xi(k_2)$.

Subsequently, the relative displacements are searched in order from $k_2$ to find $k_2'$ where $\gamma(k_2)=\gamma(k_2')$ holds true, wherein k is incremented by 1.

Likewise, a $j^{th}$ maximal value ($\gamma(k_j)$) of the relative displacement is found, and the above manipulation is repeated until an absolute value of $\gamma(k_j)$ is equal to or greater than an absolute value of the relative displacement corresponding to a maximum interlayer deformation angle of a target layer ($i^{th}$ layer) or repeated for all measurement points. Hereinafter, a value j (maximum value of index k) of the maximal value ($\gamma(k_j)$) finally found is referred to as "n". The value ($\gamma(k_n)$) is a maximum interlayer displacement.

A sequence of the index k $\{k_{0'}, \ldots, k_m, k_{m'}, \ldots, k_{m+1}, k_{m+1'}, \ldots, k_{n-1}, k_{n-1'}, \ldots, k_n\}$ is generated using the values of index k ($k_{0'}(=0)$, $k_1$, $k_{1'}$, $k_2$, $k_{2'}$, $\ldots$, $k_{n-1}$, $k_{n-1'}$, $k_n$) calculated by the above manipulation. Then, a response history line is drawn (plotted) using each point ($\gamma(k)$, $\xi(k)$) corresponding to this sequence and the origin (0, 0). (see FIG. 3B)

In the above, while k is in a range from $k_{k-1}$, to $k_k$ (1≤k≤n), the index k is incremented by 1.

A method for contracting the response history line drawn and preparing a polygonal line will be described with reference to FIGS. 4A to 4C.

First, a method for determining a first break point (P1) will be described with reference to FIGS. 4A to 4C.

One area (integral value) delimited by the response history line from an origin to a point P ($\gamma(k)$, $\xi(k)$) and an x-axis (area delimited by the response history line from the origin to the point P) and the other area of a triangle with apexes including the origin O, the point P on the response history line, and a corresponding point on the x-axis (area of a triangle up to the point P) are calculated and compared, and then, the point P where a discrepancy between the two areas is equal to or smaller than a predetermined error N % is searched for.

Figure 4A:
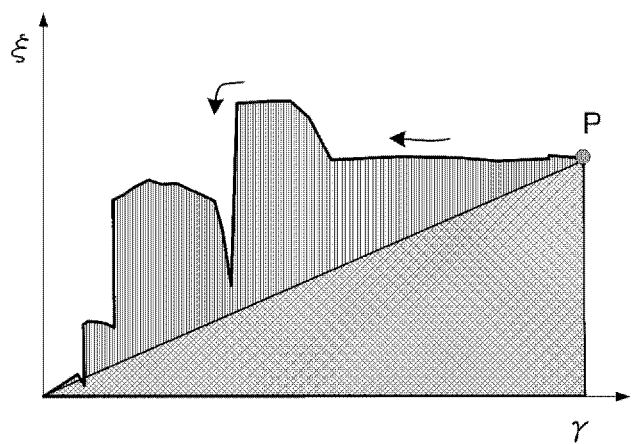
FIG. 4A, FIG. 4B, and FIG. 4C illustrate an algorithm of determining a first break point using the response history line.
Figure 4B:
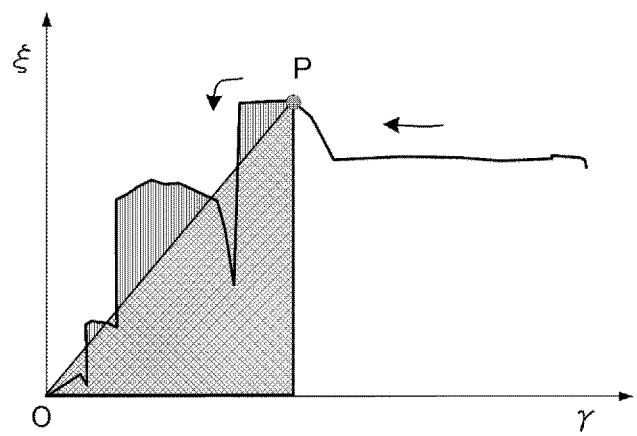
Figure 4C:
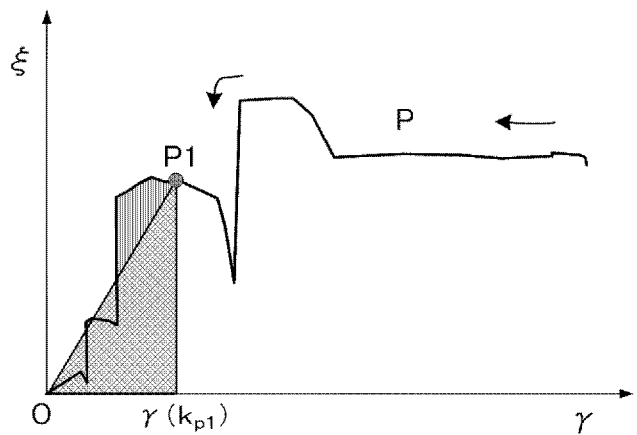

In particular, the point P ($\gamma(k)$, $\xi(k)$) is sequentially changed (moved), as the index k is sequentially decremented from the maximum value $k_n$ in the above sequence of the index k for preparing the response history line as shown in FIGS. 4A to 4C.

FIG. 4A shows an example of an algorithm where a search starts from a point P, wherein the point is on ($\gamma(k_n)$, $\xi(k_n)$).

As shown in FIG. 4B, the point P is moved along the response history line in an arrow direction, as the index k in the point ($\gamma(k)$, $\xi(k)$) is sequentially decremented from $k_n$ in the above sequence. The area delimited by the response history line from the origin to the point P and the area of a triangle up to the point P are calculated for each point P.

An absolute value of a difference between these areas is calculated, and one point where k is maximum is selected from the points allowing the discrepancy to be within a predetermined range, that is, equal to or smaller than N %. The above one point is determined as a first break point (P1), and the above value k is referred to as $k_{p1}$.

Accordingly, a formula 3 is established on the point P1: abs $(As_{0-1} - At_{0-1})/As_{0-1} \leq N$ (formula 3), wherein
$As_{0-1}$=area delimited by the response history line from origin to the point P1, and
$At_{0-1}$=area of a triangle up to the point P1.

FIG. 4C is an example showing the point P1 ($\gamma(k_{p1})$, $\xi(k_{p1})$) that satisfies the formula 3. As shown in FIG. 4C, the area delimited by the response history line from the origin to the point P1 can be approximated as the area by a triangle formed with a line segment (straight line) connecting the origin and the point P1.

The value of "discrepancy N %" needs to be preliminarily set in system construction. It is usually difficult to find the break point when too small number is set to N, but conversely, many N candidates are found when too large number is set to N. The inventors of the present invention set approximately 5% to 10% to N and could obtain a favorable result. However, the value of N is not limited to the above range, and additionally, it is of a great value to study the result found by searching for the break point using a preliminarily defined N according to one determinate condition.

Each value $\gamma(k)$ and (k) are discrete values. For example, when the index k is j and the discrepancy between the area delimited by the response history line from the origin to the point P and the area of a triangle up to the point P is greater than N % and when the index k is j−1 and the discrepancy between the two areas is smaller than −N %, or when the index k is j and the discrepancy between the two areas is smaller than −N % and when the index k is j−1 and the discrepancy between the two areas is greater than N %, ($\gamma(k_j)$, $\xi(k_j)$) and ($\gamma(k_{j-1})$, $\xi(k_{j-1})$) are linearly interpolated and a midpoint of these points may be determined as the first break point ($\gamma(k_{p1})$ and $\xi(k_{p1})$).

In this case, the number of data is to be subsequently increased, and it is preferable to renumber the index k. To sequentially search for a next new break point after the first break point was found, data in ($\gamma(k\ j-1)$, $\xi(k\ j-1)$) may be, however, temporarily replaced with data in ($\gamma(k_{p1})$, $\xi(k_{p1})$) on the above midpoint.

Figure 5A:
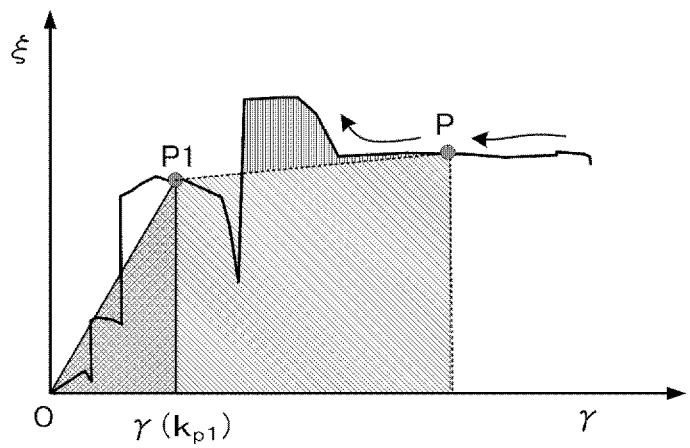
FIG. 5A, FIG. 5B, and FIG. 5C illustrate an algorithm of determining a second break point using the response history line.

Second, a second break point (P2) will be determined as shown below with reference to FIGS. 5A to 5C.

The point P ($\gamma(k)$, $\xi(k)$) is sequentially changed (moved) as the index k is sequentially decremented from the maximum value $k_n$ in the above sequence of the index k. (see FIG. 5A)

One area (integral value) delimited by the response history line from the points P1 to the point P and an x-axis and the other area of a trapezoid with apexes including the points P1 and P and corresponding two points on the x-axis (area of a trapezoid from the first break points P1 to the point P) are calculated. An absolute value of a difference between these areas is calculated, and one point where k is maximum is selected from the points allowing the discrepancy to be within a predetermined range, that is, equal to or smaller than N %, for example, 5 to 10%. The above one point is determined as a second break point (P2), and the above value k is referred to as $k_{p2}$. (see FIG. 5B)

Accordingly, a formula 4 is established on the point P2: abs $(As_{1-2} - At_{1-2})/As_{1-2} \leq N$ (formula 4), wherein
$As_{1-2}$=area delimited by the response history line from the point P1 to the point P2, and
$At_{1-2}$=area of a trapezoid from the point P1 to the point P2.

Figure 5B:
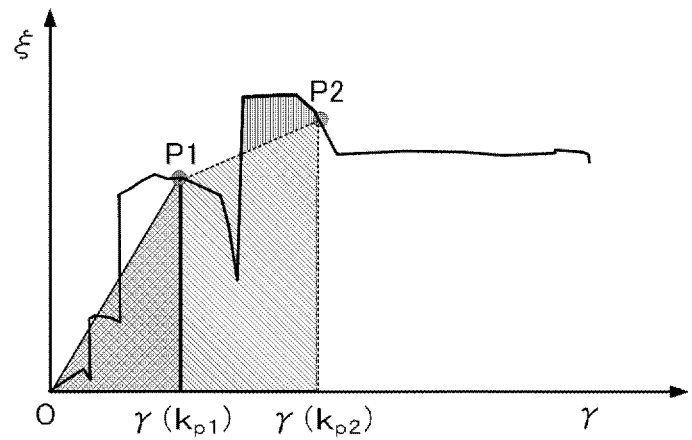
Figure 5C:
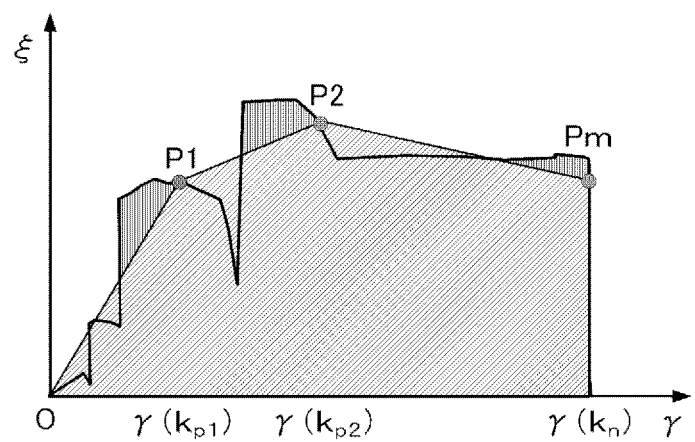

FIG. 5B is an example showing the point P2 ($\gamma(k_{p2})$, $\xi(k_{p2})$) that satisfies the formula 4. As shown in FIG. 5B, the area delimited by the response history line from the origin to the point P2 cannot be approximated as an area by a triangle formed with a line segment (straight line) from the origin to the point P2 anymore, but the deviation from the triangle is minor.

Third, a maximum response point (Pm) will be determined on the response history line. The coordinate value of the maximum response point (Pm) on the x-axis is set to $\gamma(k_n)$, wherein the displacement is maximum. The coordinate value of the maximum response point (Pm) on the y-axis is set so that one area delimited by a polygonal line connecting the origin (0, 0), the first break point P1, the second break point P2, and the maximum response point Pm, and an x-axis matches the other area delimited by the response history line from the origin to the point ($\gamma(k_n)$, $\xi(k_n)$) having the maximum relative displacement and the x-axis. (see FIG. 5C)

Accordingly, a formula 5 is established on the point Pm: $As_{0-m} = At_{sum}$ (formula 5), wherein
$As_{0-m}$="area delimited by the response history line from the point P1 to the point ($\gamma(k_n)$, $\xi(k_n)$)", and
$At_{sum}$="area of a triangle from the origin to the point P1"+"area of a trapezoid from the point P1 to the point P2"+"area of a trapezoid from the point P2 to the point Pm".

"$As_{0-m}$", "area of a triangle from the origin to the point P1", "area of a trapezoid from the point P1 to the point P2", and "area of a trapezoid from the point P2 to the point Pm" have been already determined, and thus, the coordinate value of Pm on the y-axis can be easily calculated.

A polygonal line is prepared using the points P1, P2, and Pm determined by the above algorithm for a polygonal line contraction model. In particular, the origin O, the first break point (P1), the second break point (P2), and the maximum response point (Pm) are connected with straight lines.

In the above embodiment, one example of one polygonal line having two break points is described, but other polygonal lines having three or more points, such as having additional third break point (P3) and fourth point (P4) likewise determined, can be prepared.

To determine an optional $j^{th}$ break point (Pj), a point that satisfies a formula 6 is determined: abs $(As_{j-1-j} - At_{j-1-j})/As_{j-1-j} \leq N$ (formula 6), wherein $As_{j-1-j}$ = "area delimited by the response history line from $j-1^{th}$ break point Pj−1 to $j^{th}$ break point Pj", $At_{j-1-j}$ = "area of a trapezoid from j−1th break point Pj−1 to $j^{th}$ break point Pj", and $j \geq 2$.

The formula 6 where j=2 is defined corresponds to the formula 4. Additionally, if a $0^{th}$ break point P0 is defined as the origin, the formula 3 corresponds to the formula 6 where j=1 is substituted and it is a special case.

A response history line is prepared on two quadrants: first quadrant (upper right); and third quadrant (lower left), and the response history line in one quadrant having a larger absolute value of the response displacement is adopted.

To prepare the response history line on the third quadrant, the above manipulation is repeated while sequentially finding minimal values instead of maximal values of the relative displacement γ during the manipulation for calculating the above sequence.

Computers can automatically perform the above manipulation for each layer of the building whose damage degree is to be evaluated. Such a computer to be used includes a recording device for storing γ(k) and (k) corresponding to each index k (measurement data) and a microprocessor capable of performing logical operations and four arithmetic operations, and examples of the computer include an administrative server and a personal computer.

Other methods can be also adopted as the algorithm for a polygonal line contraction model, and it should not be interpreted so as to be limited to the above accordingly.

In a second step (S2), a maximum interlayer deformation angle $\theta_i$ at a maximum response point Pm of each layer is calculated from an interlayer displacement $\delta_i$ of each layer and its corresponding interlayer height $h_i$.

In a third step (S3), a safety limit deformation angle $\theta_{i, max}$ of the building is calculated using unprocessed values, which is predetermined when the building was designed, if possible, or using F value of an earthquake-resisting diagnosis or the equivalent parameter (e.g. time history response analysis).

If a safety limit deformation angle $\theta_{i, max}$ of each layer can be previously stored in the recording device or the like, for example, if the unprocessed values, which was predetermined when the building was designed, can be utilized, the safety limit deformation angle $\theta_{i, max}$ can be obtained by downloading (inputting) it from the recording device or the like using the microprocessor.

In a fourth step (S4), the polygonal lines of the respective layers determined in the first step (S1) are compared, and one layer (floor) having a polygonal line with the smallest safety margin $\alpha_i$ is selected. In this step, a difference from the maximum interlayer deformation angle $\theta_i$ to the safety limit deformation angle $\theta_{i, max}$ of each layer is calculated as a safety margin $\alpha_i$ and one layer (floor) having the smallest $\alpha_i$ is selected.

In a fifth step (S5), a safety limit point Ps is calculated from the polygonal line of the performance curve (FIG. 6A) selected in the fourth step (S4).

Figure 6A:
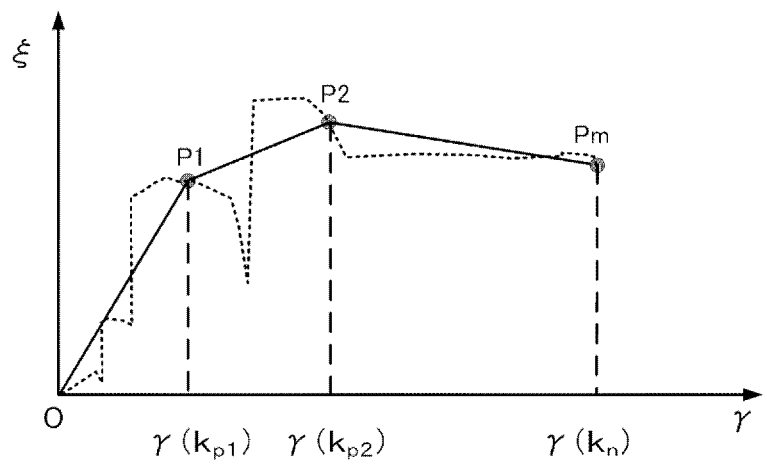
FIG. 6A, FIG. 6B, and FIG. 6C illustrate an algorithm of defining damage degree categories using the polygonal line.
Figure 6B:
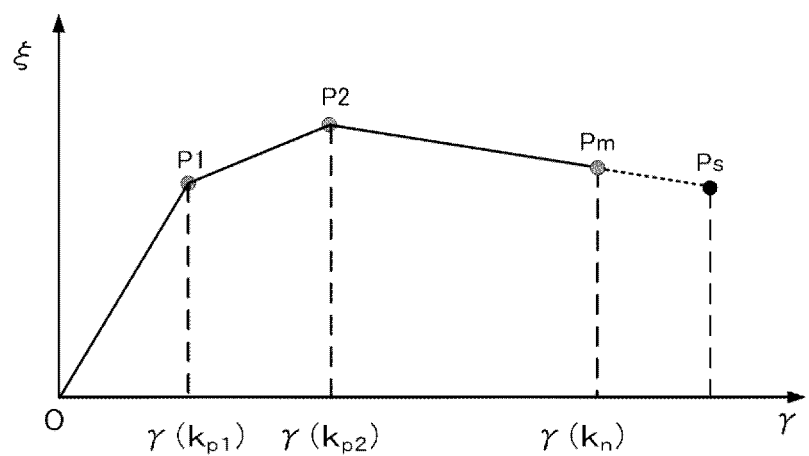

FIG. 6B shows a polygonal line of the selected performance curve, wherein the points P2 and Pm are connected by a straight line and the safety limit point Ps calculated in the fourth step (S4) is plotted on the point Pm side on an extension line of the straight line. One point where a value on x-axis is the relative displacement corresponding to the safety limit deformation angle $\theta_{i, max}$ is determined as the point Ps on the straight line connecting the points P2 and Pm that have been determined.

In a sixth step (S6), damage degree categories (I) to (VI) are defined using the first break point P1 and the second break point P2 determined in the Step S1 and the safety limit point Ps.

In detail, a segment (I) from the origin to the first break point P1 is defined as no damage;

a segment (II) from the first break point P1 to the second break point P2 is defined as minor damage;

a remaining segment (displacement) from the second break point P2 to the safety limit point Ps is divided into three equal sections, and a segment (III) that is the most closest to the point P2 is defined as slight damage;

a segment (IV) that is the second closest is defined as half damage;

a segment (V) that is the third closest (the farthest) is defined as heavy damage; and a segment (VI) on the right side of the safety limit point Ps is defined as collapse.

In the above segments, the segment (I) refers to a state that a target layer can be regarded as having elasticity and the building is assessed to return to the approximately original state after the load is removed, the segment (II) refers to a state that lowered rigidity in the target layer is evaluated mainly due to cracks or the like but the steel material or the like has not been yielded and the restoring force can be expected, and the segment (VI) refers to a dangerous state that the target layer state has exceeded the safety limit.

Figure 6C:
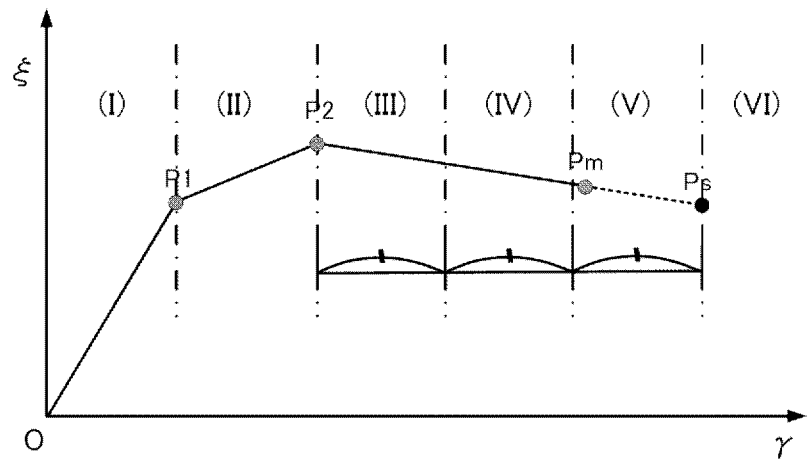

FIG. 6C shows the damage degree categories defined in the sixth step (S6). The inventors of the present invention have confirmed that the above way of classification (categories) can be used as a typical method for evaluating damage degree, but other ways of classification may be used. Conditions involved in buildings, such as the building that has already damaged, are various, and thus, the categories need to be appropriately supposed depending on each building.

In a seventh step (S7), the category to which the maximum response point Pm corresponds is finally decided. Thus, damage degree can be automatically calculated (evaluated) according to the damage degree categories. In an example in FIG. 6C, it is decided that the response point Pm corresponds to a "category (V): heavy damage".

As described above, the complicated performance curves of respective layers are contracted into polygonal lines, and damage degree can be automatically evaluated according to the damage degree categories using the polygonal lines.

INDUSTRIAL APPLICABILITY

According to the present invention, the microprocessor of computers or the like enables damage degree to be automatically evaluated according to the damage degree categories by using the polygonal lines automatically contracted on the basis of actually measured data without assuming any special model of the building. Therefore, damage degree can be quickly evaluated without specially trained engineers, and the industrial applicability is extremely large.

REFERENCE SIGNS LIST

10: accelerometer
11: administrative server

The invention claimed is:

1. A method for deciding a damage degree category of a building having one or more layers, the method comprising:
    determining a polygonal line from a performance curve of each of said one or more layers of the building, the polygonal line including a first break point, a second break point, and a maximum response point, wherein the first break point and the second break point are searched in this order as maximum points within a predetermined range of discrepancy between the performance curve and the polygonal line;
    calculating a maximum interlayer deformation angle of each of said one or more layers from a maximum interlayer displacement of each of said one or more layers and a corresponding interlayer height;
    calculating a safety limit deformation angle of each of said one or more layers;
    calculating a safety margin of each layer each of said one or more layers from the maximum interlayer deformation angle and the safety limit deformation angle of each of said one or more layers, comparing the safety margins, and selecting one polygonal line having a smallest safety margin of the safety margins;
    calculating a safety limit point using the selected polygonal line;
    defining damage degree categories (☐) to (☐) using the first break point and the second break point and the safety limit point, wherein the damage degree category (I) is defined with the first break point, the damage degree category (II) is defined with the second break point, the damage degree categories (III) to (VI) are defined with the second break point and the safety limit point; and
    deciding one damage degree category, to which said maximum response point corresponds, out of the damage degree categories.

2. The method for deciding the damage degree category according to claim 1,
    wherein a response history line is determined by sequentially searching for either one of a maximal value and a minimal value of a relative displacement in the performance curve, and
    wherein one area delimited by the response history line from an origin to the first break point and another area of a triangle with apexes including the origin and the first break point are calculated, and a discrepancy between the two areas is within the predetermined range.

3. The method for deciding the damage degree category according to claim 1,
    wherein one area delimited by a response history line from the first break point to the second break point and another area of a trapezoid with apexes including the first break point and the second break point are calculated, and a discrepancy between the two areas is within the predetermined range.

4. The method for deciding the damage degree category according claim 1,
    wherein the performance curve is constructed by time-series measured data of a relative displacement and an absolute acceleration.

5. The method for deciding the damage degree category according to claim 1,
    wherein the performance curve is determined from a single or a plurality of waveforms decomposed into respective frequencies by frequency analysis.

6. A system for deciding a damage degree category comprising:
    at least one sensor selected from an accelerometer, a velocimeter, and a displacement meter, the sensors being installed on all layers or a plurality of predetermined layers of a building;
    a recording device for storing measured data of each of said one or more layers; and
    a microprocessor for processing the measured data, the microprocessor determining a performance curve of each of said one or more layers of the building from the measured data of each layer each of said one or more layers stored in the recording device,
    the microprocessor performing:
        determining from each of the said performance curves a polygonal line including a first break point, a second break point, and a maximum response point, wherein the first break point and the second break point are searched in this order as maximum points within a predetermined range of discrepancy between the performance curve and the polygonal line,
        calculating a maximum interlayer deformation angle of each of said one or more layers from a maximum interlayer displacement of each of said one or more layers and a corresponding interlayer height,
        calculating a safety limit deformation angle of each of said one or more layers,
        calculating a safety margin of each of said one or more layers from the maximum interlayer deformation angle and the safety limit deformation angle of each of said one or more layers, comparing the safety margins, and selecting one polygonal line having a smallest safety margin of the safety margins;
        calculating a safety limit point from the selected polygonal line;
        defining damage degree categories (☐) to (☐) using the first break point and the second break point and the safety limit point, wherein the damage degree category (I) is defined with the first break point, the damage degree category (II) is defined with the second break point, the damage degree categories (III) to (VI) are defined with the second break point and the safety limit point; and
        deciding one damage degree category, to which a maximum response point corresponds, out of the damage degree categories.

7. The system for deciding the damage degree category according to claim 6,
    wherein a response history line is determined by sequentially searching for either one of a maximal value and a minimal value of a relative displacement in the performance curve, and
    wherein one area delimited by the response history line from an origin to the first break point and another area of a triangle with apexes including the origin and the first break point are calculated and a discrepancy between the two areas is within the predetermined range.

8. The system for deciding the damage degree category according to claim 7,
   wherein one area delimited by the response history line from the first break point to the second break point and another area of a trapezoid with apexes including the first break point and the second break point are calculated, and a discrepancy between the two areas is within the predetermined range.

9. The system for deciding the damage degree category according to claim 6,
   wherein the performance curve is constructed by time-series measured data of the relative displacement and an absolute acceleration.

10. The system for deciding the damage degree category according to claim 6,
    wherein the performance curve is determined from a single or a plurality of waveforms decomposed into respective frequencies by frequency analysis.

* * * * *